L. M. SPEER.

Washing Sand.

No. 1,687. Reissued May 31, 1864.

WITNESSES:

INVENTOR.

UNITED STATES PATENT OFFICE.

L. M. SPEER, OF BELLE VERNON, PENNSYLVANIA.

WASHING SAND.

Specification forming part of Letters Patent No. 33,108, dated August 20, 1861; Reissue No. 1,687, dated May 31, 1864.

*To all whom it may concern:*

Be it known that I, L. M. SPEER, of Belle Vernon, Fayette county, State of Pennsylvania, have invented a new and Improved Machine for Washing Sand; and I do hereby declare that the following is a full, clear, and exact description thereof, reference being had to the accompanying drawings, making a part of this specification, in which—

Figure 1:
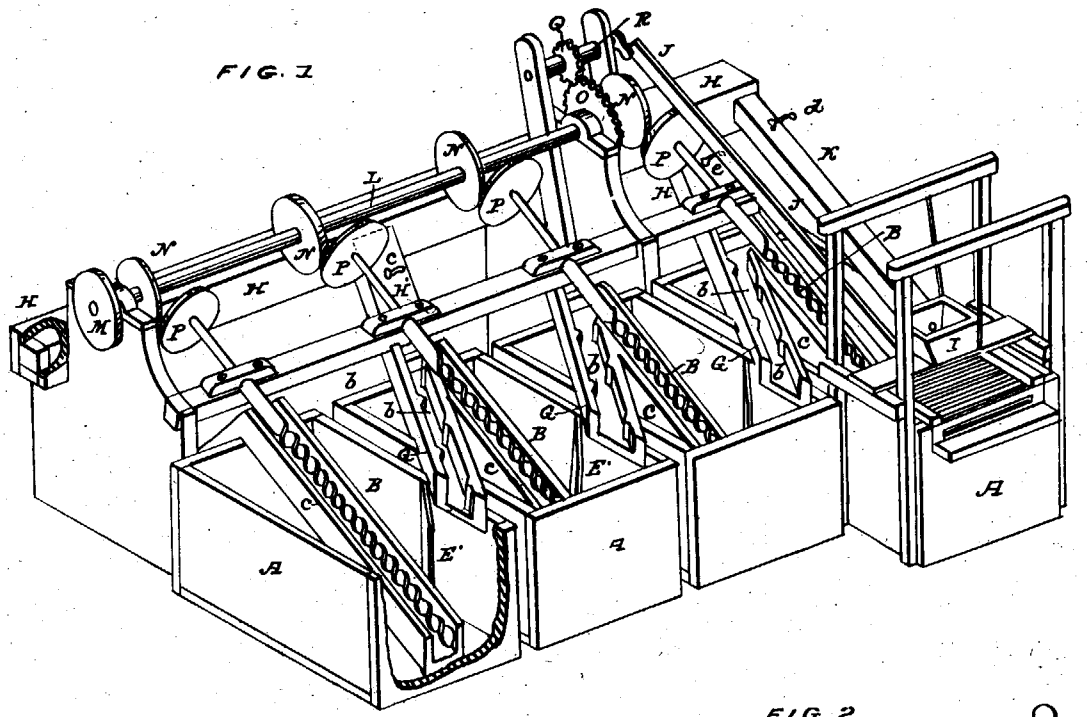
Figure 2:
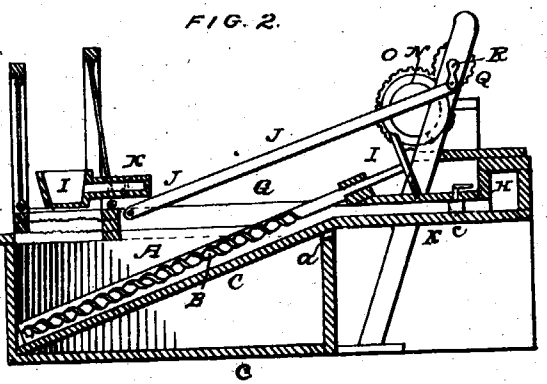
Figure 3:
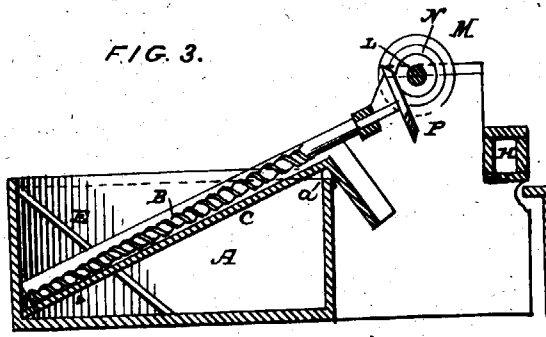

Figure 1 is a perspective view of my improved machine. Figs. 2 and 3 are vertical transverse sections showing the interior arrangement and construction of my machine.

Similar letters of reference indicate corresponding parts in the three figures.

The object of my invention and improvement in washing sand to be used in the manufacture of glass is to so construct a machine that the sand can be elevated by an agitating movement from one point to another through a body of water and conducted into a sluice trough or spout which has a stream of water running through it, as will be hereinafter described.

Another object of my invention is to conduct the sand in its several stages of purity from one water bath to another through a number of baths, and at the same time to subject the sand to the action of one or more agitating screw-conveyers and one or more descending sluice-passages, as will be hereinafter described.

To enable others skilled in the art to make and use my invention, I will describe its construction and operation.

In the accompanying drawings I have represented the manner of conducting the sand successively through a number of baths, each one of which is constructed and operates upon the same principle. These baths consist essentially of boxes A A, adapted for holding water up to a certain level, above which the water is allowed to flow off through passages *a* in the back board of each box, as shown in Figs. 2 and 3. At or near one end of one of the baths I arrange one or more vibrating screens, over which is a hopper, I, into which a trunk, K, leads, as shown in Figs. 1 and 2. The trunk K enters the hopper I just above its bottom opening and discharges water into said hopper, which is received from the hollow trunk H, arranged as shown in Fig. 1, for delivering water to the several baths. The sand, after leaving the hopper I, falls upon the moving screens, where the gravel and larger particles are separated from it. The fine sand then falls into the first bath A, from which it is conducted upward through the first inclined gutter or trough by means of a spiral or screw shaft, B, that is rotated by means of gearing P N, or in any other convenient manner. The screw B conveys the sand upward through the water in the bath-box A and delivers this sand into the inclined and diagonal sluice-trough G, through which a stream of water is kept constantly flowing from the main feed-trough H. This inclined sluice or chute G is intended for receiving the sand from the elevator B and subjecting this sand to the action of a flowing stream of water, and then conducting it down into a box or bath, A, corresponding to the first bath above described.

It will be seen by reference to Fig. 1 that the chute G has a number of beveled deflectors or off-sets, *b b*, arranged on its inner sides in such manner as to break the direct course of the stream of water and sand passing down the chute, and thus to subject the sand to a thorough washing and to give it a zigzag course through the said chute. The sand, together with the water, is discharged into the forward part of the second bath A, which is furnished with an elevator and a chute or sluice-trough corresponding to those just described, and which conduct the sand into a third bath, to be acted upon as described, and so on, the sand can be elevated from one bath and deposited in another bath until it is thoroughly washed, separated, and deprived of its solvent and other foreign substances.

The vertical and inclined stops E E′ are arranged in the receiving ends of the bath for the purpose of keeping the sand in a position where it can be conveyed upward through the inclined conveyers.

The branch troughs leading from the main trough H are or may be furnished with gates for regulating or cutting off the flow of water from said main.

The main driving-shaft L communicates motion to the screen or screens arranged beneath hopper I through the medium of spur-gearing O Q and pitman J, and this shaft also drives the screw-conveyers, whatever may be the number employed.

The operation of the machine is as follows: The conveyers and screens being set in motion and the gates of the branches leading from the main H opened, sand is introduced into the hopper I, and there subjected to the action of a stream of water. From the hopper the sand falls in a partially-washed condition upon the vibrating screen, from whence it falls free from gravel into the first box A of the series, and from said box it is elevated by the first of a series of screws to the top of the box and deposited in the first diagonal sluice of the series. Here it is met by a flowing stream of water, and thus caused to descend through the serpentine passage of the sluice into the second box of the series. From the second box the sand is elevated by the second screw of the series to the top of the box and deposited into the second sluice of the series, from which it is forced by a stream of water from trunk H into the third box of the series. Thus the operation of lifting the sand successively from one box to another and subjecting it to a washing action continues until it arrives at the discharge-spout of the last box of the series, when it falls into a receiver. As the sand is conducted through the several baths, the muddy water flows off from the several boxes through passages *a a*, and therefore the water in the second or third bath is nearly clean, the soft or solvent substances being carried off in the preceding baths.

From the above description of my invention it will be seen that the sand is lifted through a body of water in the bath, and that during this lifting operation the screw gives a zigzag course to the sand and keeps it in constant agitation, after which the sand is subjected to the action of a rapidly-descending stream of water, which further cleans the sand and conducts it into another bath. If desirable, the operation of washing may stop here; but where the sand is very impure and caked it can be passed through several waters.

Having thus described my invention, what I claim as new, and desire to secure by Letters Patent, is—

1. An apparatus for washing sand, which is so constructed that the sand will be elevated through a body of water or bath, and at the same time receive a zigzag or undulating movement, and thereby caused to deposit its impurities into said bath, substantially as described.

2. An inclined sluice trough, in combination with an inclined screw elevator or elevators and one or more water baths operating substantially as described.

3. Conducting the water used in washing the sand from a main trunk, H, or its equivalent, through an inclined sluice, which is so arranged as to receive the sand from elevator G and to deposit both the sand and water into suitable baths or receptacles arranged beneath said sluice, substantially as described.

L. M. SPEER.

Witnesses:
E. T. HOUSEMAN,
ALEX R. BROWN.